United States Patent
Li et al.

(10) Patent No.: US 9,913,293 B2
(45) Date of Patent: Mar. 6, 2018

(54) METHOD AND NETWORK NODE FOR COORDINATION OF CHANNEL RESOURCES BETWEEN TRANSMISSIONS

(71) Applicant: Telefonaktiebolaget L M Ericsson (publ), Stockholm (SE)

(72) Inventors: Gen Li, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 14/892,741

(22) PCT Filed: May 27, 2013

(86) PCT No.: PCT/CN2013/076247
§ 371 (c)(1),
(2) Date: Nov. 20, 2015

(87) PCT Pub. No.: WO2014/190465
PCT Pub. Date: Dec. 4, 2014

(65) Prior Publication Data
US 2016/0119952 A1    Apr. 28, 2016

(51) Int. Cl.
*H04Q 7/00* (2006.01)
*H04W 74/04* (2009.01)
(Continued)

(52) U.S. Cl.
CPC ........... *H04W 74/04* (2013.01); *H04W 74/02* (2013.01); *H04W 74/08* (2013.01)

(58) Field of Classification Search
CPC ...... H04W 74/04; H04W 74/08; H04W 74/02
(Continued)

(56) References Cited

U.S. PATENT DOCUMENTS 8,185,102 B2 *  5/2012  Yang ................. H04W 74/0816
                                                         370/310
8,625,497 B2 *  1/2014  Stephens ............... H04W 74/06
                                                         370/329
(Continued)

FOREIGN PATENT DOCUMENTS

WO    WO 2009/007953 A1    1/2009

OTHER PUBLICATIONS

PCT International Search Report for International application No. PCT/CN2013/076247, dated Mar. 6, 2014.
(Continued)

*Primary Examiner* — Chuong T Ho
(74) *Attorney, Agent, or Firm* — Baker Botts, LLP

(57) ABSTRACT

The present disclosure provides a method (700) and a network node (800) for coordination of channel resources between a first transmission and a second transmission sharing a common channel. The method (700) includes: detecting (S710) a first traffic status of the first transmission and a second traffic status of the second transmission during a time period; and applying (S720) one of a first frame configuration and a second frame configuration to a frame based on a probability value dependent on the first traffic status and the second traffic status. When the first frame configuration is applied to the frame, the first transmission uses the channel within the duration of the frame regardless of whether the second transmission is using the channel. When the second frame configuration is applied to the frame, the first transmission is disabled or shares the channel with the second transmission in a contention-based manner within the duration of the frame.

19 Claims, 3 Drawing Sheets

(51) Int. Cl.
*H04W 74/02* (2009.01)
*H04W 74/08* (2009.01)

(58) Field of Classification Search
USPC .................. 370/336, 329, 331, 328, 330
See application file for complete search history.

(56) References Cited

U.S. PATENT DOCUMENTS

| | | | | |
|---|---|---|---|---|
| 8,630,239 | B2* | 1/2014 | An | H04W 74/008 370/329 |
| 2002/0071449 | A1 | 6/2002 | Ho et al. | |
| 2008/0171550 | A1 | 7/2008 | Zhao | |
| 2013/0064236 | A1* | 3/2013 | Ji | H04W 74/0816 370/338 |
| 2013/0194982 | A1* | 8/2013 | Fwu | H04W 72/0493 370/280 |
| 2014/0328183 | A1* | 11/2014 | Au | H04W 28/0284 370/237 |
| 2015/0296508 | A1* | 10/2015 | Fan | H04W 72/0446 370/329 |

OTHER PUBLICATIONS

LAN/MAN Standards Committee, IEEE Standard for Local and metropolitan area networks Part 16: Air Interface for Broadband Wireless Access Systems Amendment 2: Improved Coexistence Mechanisms for License-Exempt Operation (pp. 108-114), Jul. 30, 2010.
36th Annual IEEE Conference on Local Computer Networks; Interframe Spacing Adaptation Method for IEEE 802.11 WLANs Coexisting with IEEE 802.16 Networks by Boram Choi et al., 2011.
Reactive Cognitive Radio Algorithms for Co-Existence between IEEE 802.11b and 802.16a Networks by Xiangpeng Jing et al., 2011.
Spectrum Co-existence of IEEE 802.11b and 802.16a Networks using the CSCC Etiquette Protocol by Xiangpeng Jing et al., 2005.
The 17th Annual IEEE International Symposium on Personal, Indoor and Mobile Radio Communications (PIMRC '06); Unlicensed Operation of IEEE 802.16: Coexistence with 802.11(A) in Shared Frequency Bands by Lars Berlemann et al., 2006.
Chung-Ju Chang et al., Fuzzy Active Period Adaptation for Dynamic Spectrum Access in IEEE 802.16h System, Communications and Networking in China, 2009. ChinaCOM 2009. Fourth International Conference, Aug. 28, 2009.
GholamHossein EkbataniFard, Multi-channel Medium Access Control Protocols for Wireless Sensor Networks: A Survey, Telecommunication in Modern Satellite Cable and Broadcasting Services(telsiks), Journal of Advances in Computer Research vol. 2, No. 2, May 31, 2011.
Supplementary European Search Report for Application No. EP 13 88 5493—Dec. 14, 2016.

* cited by examiner

METHOD AND NETWORK NODE FOR COORDINATION OF CHANNEL RESOURCES BETWEEN TRANSMISSIONS

This nonprovisional application is a U.S. National Stage Filing under 35 U.S.C. § 371 of International Patent Application Serial No. PCT/CN2013/076247, filed May 27, 2013, and entitled "Method And Network Node For Coordination Of Channel Resources Between Transmissions."

TECHNICAL FIELD

The present disclosure relates to communication technology, and more particularly, to a method and a network node for coordination of channel resources between transmissions.

BACKGROUND

As wireless devices become increasingly widespread, there is a huge demand for frequency spectrum to meet the explosive increase in data traffic. Unfortunately, frequency spectrum is very scarce and the efficient utilization of frequency resources is thus crucial. It is known that the frequency spectrum is heavily crowded and fragmented, with most frequency bands already assigned to various licensed services. The other frequency bands, especially low frequency bands, are not sufficient to meet future requirements of wireless broadband services.

Accordingly, a technique of spectrum sharing between different systems is a promising solution to overcome the spectral shortage problem in future system designs. Generally, in practical systems, frequency spectrum has been shared among different users in the same network. For example, the frequency spectrum can be shared between different cells in a cellular network with appropriate network planning and interference mitigation techniques. Also, in unlicensed bands, many Medium Access Control (MAC) protocols, such as ALOHA and Carrier Sense Multiple Access (CSMA), have been proposed to enable spectrum sharing among homogeneous users. However, for heterogeneous systems having different configurations (e.g. frame-based scheduled system vs. contention-based system), spectrum sharing becomes especially complicated.

A frame-based scheduled system, as used herein, refers to a communication system based on a predefined frame structure and allocates resources to different Mobile Stations (MSs) for orthogonal transmission under the control of a base station (BS). In other words, the transmission in such system is scheduled frame by frame. Examples of frame-based scheduled systems include the 3$^{rd}$ Generation Partnership Project (3GPP) Long Term Evolution (LTE) system and the Institute of Electrical and Electronic Engineers (IEEE) 802.16e system. In this context, a transmission in a frame-based scheduled system is referred to as a frame-based scheduled transmission.

FIG. 1 shows an example frame structure in a frequency channel in a frame-based scheduled system. The frame structure is known to a BS and all MSs served by the BS. For a Frequency Division Duplex (FDD) system, Frames #0 to #3 are all used for downlink (DL) or uplink (UL) transmission. For a Time Division Duplex (TDD) system, each of Frames #0 to #3 is configured by the upper layer as a DL or UL frame. MAC Protocol Data Units (PDUs) are scheduled to be transmitted in these frames.

A contention-based system, as used herein, refers to a communication system in which MSs share a channel in a contention-based manner. In a typical contention-based system, a sensing-based collision avoidance mechanism is used at the MAC layer and a PDU is not transmitted in a predefined time point. An example of contention-based system is the Wi-Fi system, which allows MSs to transmit/receive data wirelessly via an Access Point (AP). The Wi-Fi system is also known as the wireless local area network (WLAN) system or the IEEE 802.11 system. In this context, a transmission in a contention-based system is referred to as a contention-based transmission.

FIG. 2 is a schematic diagram of the MAC layer mechanism of the Wi-Fi system. The basic IEEE 802.11 MAC layer employs a Carrier Sense Multiple Access with Collision Avoidance (CSMA/CA) mechanism. The same mechanism applies to all stations including the MSs and the AP, i.e. in both downlink and uplink. Any station that wishes to transmit a packet first senses the medium. If the medium is sensed to be idle for a minimum time period known as Distributed Inter Frame Space (DIFS, which is 50 μs for 802.11b), the packet is then transmitted, as can be seen from the operation sequence of Station 1 in FIG. 2. If the medium is sensed to be busy, the station first defers the transmission until the medium is sensed to be idle, as can be seen from the operation sequence of Station 2 in FIG. 2. At this time, however, the station does not transmit the packet immediately as it may lead to a collision if more than one station starts transmission immediately after sensing the medium to be idle. Instead, the station sets a backoff timer to a random number, and does not transmit until this timer has expired. The backoff timer is only decreased when the medium is sensed to be idle; whereas, whenever the medium is sensed to be busy, a deferral state is entered where the backoff timer is not decreased. When the backoff timer expires, the packet is transmitted. If the packet is successfully received by the receiver, the receiver responds to the transmitter with an acknowledgement (ACK). The acknowledgement is sent after a Short Inter Frame Space (SIFS, which is 10 μs for 802.11b) from the data frame being received. Since SIFS<DIFS, no other user will access the medium during this time period. If no acknowledgement is received, either because the packet itself or the acknowledgement was lost, the transmitter starts a new backoff timer, and retransmits the packet when the new backoff timer has expired. Even if the packet is successfully acknowledged, the transmitter needs to start another backoff timer and wait for it to expire before transmitting the next packet. To avoid congestion, when a collision occurs, the backoff values are drawn from distributions with larger and larger expectations for every retransmission attempt. The backoff time is measured in units of time slots, which are 20 μs for 802.11b.

FIG. 3 shows a schematic diagram of an example coexistence scenario in which two systems share a frequency channel. As shown in FIG. 3, for example, a base station BS1 and a mobile station MS1 are stations in a frame-based scheduled system, while a base station BS2 and a mobile station MS2 are stations in a contention-based system. It can also be seen that BS2 and MS2 are located in the coverage of BS1. In this case, when all frames are scheduled to be used by BS1 for its communication with MS1, i.e., when the channel is continuously occupied by BS1, BS2 will have no chance to transmit any data since it always senses that the channel is busy. Obviously this does not meet the requirement of fairness between systems and new mechanisms should be designed to solve this coexistence problem.

IEEE 802.16h is an amendment to expand IEEE 802.16 standard, specifying improved mechanisms such as policies and MAC enhancements to enable coexistence among license-exempt systems and to facilitate the coexistence of such systems. Non-patent document "IEEE Standard 802.16h-2010, Air interface for broadband wireless access systems Amendment 2: Improved coexistence mechanisms for license-exempt operation, Jul. 30, 2010", which is incorporated herein by reference, provides a coexistence mechanism known as coordinated contention-based protocol (CX-CBP) which applies to license-exempt frequency bands for coexistence with contention-based systems.

FIG. 4 shows a frame structure for CX-CBP. As shown in FIG. 4, MAC Frames #0 and #1 are configured as schedule-based frames and the time interval composed of Frames #0 and #1 is referred to as CX-SBI (Coordinated Coexistence Schedule-Based Interval). MAC Frames #2 and #3 are configured as contention-based frames and the time interval composed of Frames #2 and #3 is referred to as Coordinated Coexistence Contention-Based Interval (CX-CBI).

From the perspective of the 802.16h system which is a frame-based scheduled system and shares a channel with a contention-based system (e.g., 802.11 system), during the CX-SBI, the 802.16h system uses the channel for data transmission regardless of whether the contention-based system is using the channel; while during the CX-CBI, the 802.16h system uses the channel in accordance with a Scheduled Listen-Before-Talk (SLBT) mechanism.

Before any transmission during the CX-CBI, an IEEE 802.16h station shall first check if the channel is idle. If the channel is idle for at least a particular time period before a predefined transmission time point of the IEEE 802.16h station, the IEEE 802.16h station shall start its transmission at the predefined transmission time point. If the channel is busy, the transmission shall be deferred until the next predefined transmission opportunity.

In order to provide transmission opportunity for the contention-based system, the simplest way is that the 802.16h system configures an entire frame in a CX-CBI as a Quiet Period (QP) during which the 802.16h system is quiet without transmitting any data. However, this may result in a waste of transmission resources especially when the contention-based system has a low traffic.

Thus, a Contention Window (CW) mechanism, which enables multiple systems to access the channel while reducing potential collisions, is introduced in the IEEE 802.16h standard to alleviate the resource waste. FIG. 5 shows a frame structure in which the CW mechanism is applied. As shown in FIG. 5, two contention windows (CWs) are predefined in the CX-CBI. The IEEE 802.16h station will randomly select a time point in each CW as a transmission opportunity (referred to as LBT TXOP since the transmission can only be carried out after confirming that the channel is idle. In addition, the transmission is only limited from the LBT TXOP to the end of this CW. For more details about the CW mechanism, reference can be made to "IEEE Standard 802.16h-2010, Air interface for broadband wireless access systems Amendment 2: Improved coexistence mechanisms for license-exempt operation, Jul. 30, 2010".

However, according to the above technique, the scheduled system alternates deterministically between CX-SBI and CX-CBI to satisfy a particular fixed duty-cycle defined for the system. For example, in FIG. 3, the scheduled system is scheduled to transmit every two frames. That is, the frame configuration, i.e. schedule-based or contention-based, is fixed. However, in most practical scenarios, the coexisting systems typically have asymmetric traffic, e.g., the contention-based system may have much higher or lower traffic load than the scheduled system in different time periods, which will result in the resource waste and degraded performance for both systems.

FIG. 6 shows an example channel use scenario in which the scheduled system has higher traffic than the contention-based system. As can be seen from FIG. 6, at the first TXOP, the scheduled system senses that the channel is busy (occupied by the contention-based system) and cannot transmit any data. At the second TXOP, the scheduled system senses that the channel is idle and can start transmission. However, as described above, the transmission is only limited from the TXOP to the end of the CW. Therefore, the overall channel use rate is very low and a large amount of packets will be queued in the scheduled system. On the other hand, when the contention-based system has higher traffic than the scheduled system, similar problem will occur due to such fixed frame configuration.

There is thus a need for a solution for coordination of channel resources between systems, capable of achieving a tradeoff between minimization of inter-system collision and maximization the performance of each system, especially in the scenario in which the systems have asymmetric traffics.

SUMMARY

It is an object of the present disclosure to overcome at least some of the above problems in the prior art.

According to a first aspect of the present disclosure, a method in a network node for coordination of channel resources between a first transmission and a second transmission sharing a common channel is provided. The method includes: detecting a first traffic status of the first transmission and a second traffic status of the second transmission during a time period; and applying one of a first frame configuration and a second frame configuration to a frame based on a probability value dependent on the first traffic status and the second traffic status. When the first frame configuration is applied to the frame, the first transmission uses the channel within the duration of the frame regardless of whether the second transmission is using the channel. When the second frame configuration is applied to the frame, the first transmission is disabled or shares the channel with the second transmission in a contention-based manner within the duration of the frame.

In an embodiment, the first transmission is a frame-based scheduled transmission and the second transmission is a contention-based transmission.

In an embodiment, the first traffic status is measured by a first amount of data transmitted in the first transmission during the time period and the second traffic status is measured by a second amount of data transmitted in the second transmission during the time period.

In an embodiment, the probability value is indicative of a probability at which the first frame configuration is to be applied to the frame and is dependent on the ratio of the first amount to the second amount.

In an embodiment, the first traffic status is measured by a first length of time when the channel is occupied by the first transmission during the time period and the second traffic status is measured by a second length of time when the channel is occupied by the second transmission during the time period.

In an embodiment, the probability value is indicative of a probability at which the first frame configuration is to be applied to the frame and is dependent on the ratio of the first length to the second length.

In an embodiment, the probability value is generated by a randomizer based on a probability distribution function dependent on the first traffic status and the second traffic status.

In an embodiment, the probability distribution function is a 0-1 probability distribution function.

In an embodiment, the method further includes: determining whether an aggregated occupancy of the first transmission within a specific period exceeds a threshold. The steps of detecting and applying are performed only when the aggregated occupancy of the first transmission exceeds the threshold.

According to a second aspect of the present disclosure, a network node is provided. The network node includes: a transceiver; a processor coupled to the transceiver; and a memory coupled to the processor and storing instructions which, when executed by the processor, cause the network node to perform the method according to the first aspect of the present disclosure.

In an embodiment, the network node is a base station.

With the embodiments of the present disclosure, the resource utilization of a channel shared by two transmission systems can be improved, especially when the two transmission systems have asymmetric traffics. In addition, the embodiments of the present disclosure can be implemented in one transmission system only, without modification to the other transmission system.

BRIEF DESCRIPTION OF THE DRAWINGS

The above and other objects, features and advantages will be more apparent from the following description of embodiments with reference to the figures, in which.

DETAILED DESCRIPTION

The embodiments of the present disclosure will be detailed below with reference to the drawings. It should be noted that the following embodiments are illustrative only, rather than limiting the scope of the present disclosure.

Figure 1:
FIG. 1 is a schematic diagram of an example frame structure in a frame-based scheduled system.
Figure 2:
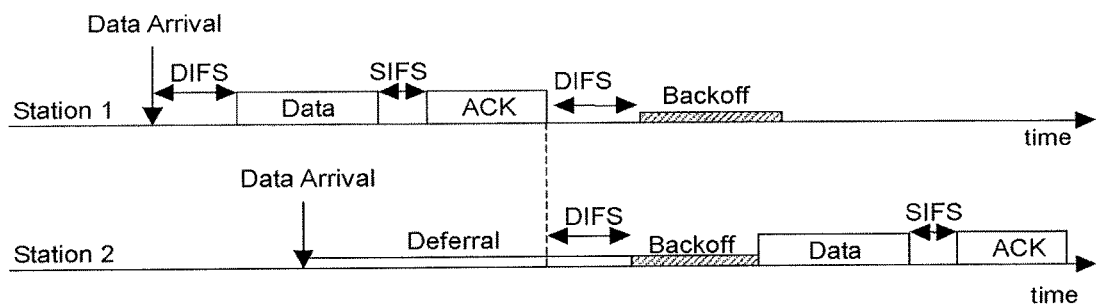
FIG. 2 is a schematic diagram of the MAC layer mechanism of the Wi-Fi system.
Figure 3:
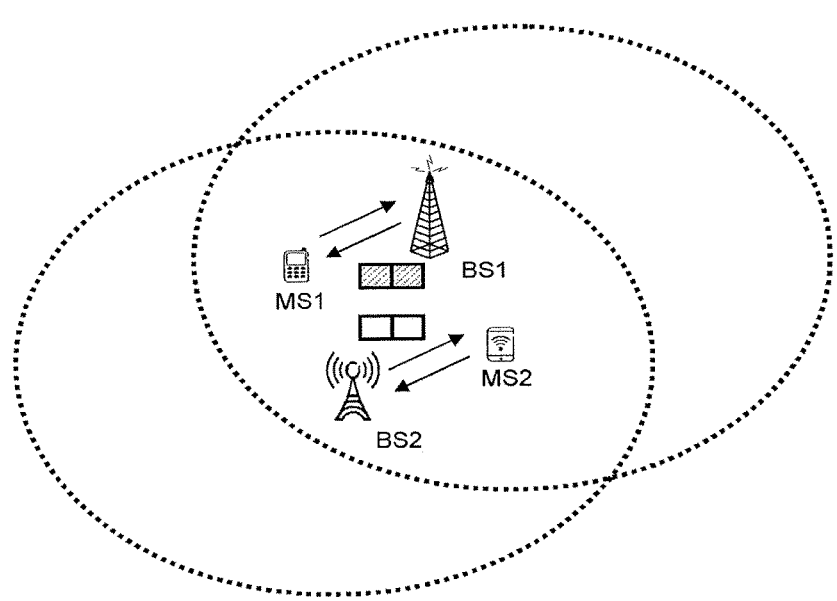
FIG. 3 is a schematic diagram of an example coexistence scenario.
Figure 4:
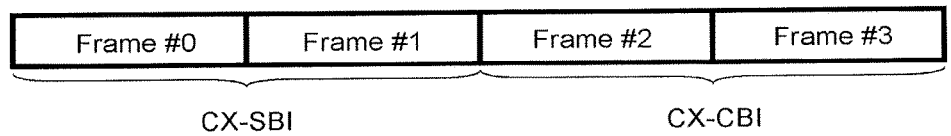
FIG. 4 is a schematic diagram of a frame structure for CX-CBP.
Figure 5:
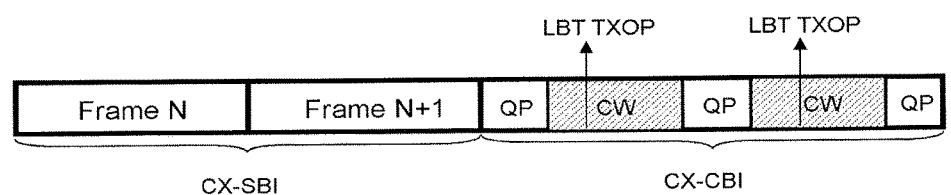
FIG. 5 is a schematic diagram of a frame structure in which the CW mechanism is applied.
Figure 6:
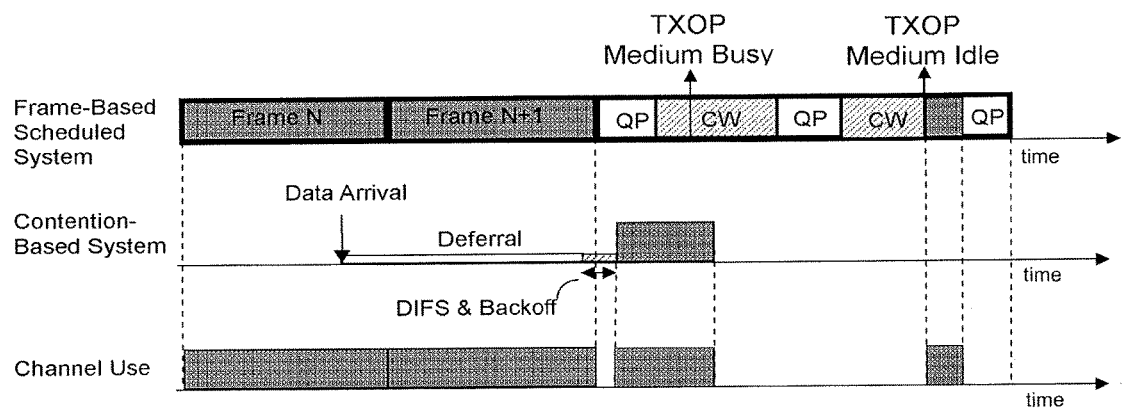
FIG. 6 shows an example channel use scenario.
Figure 7:
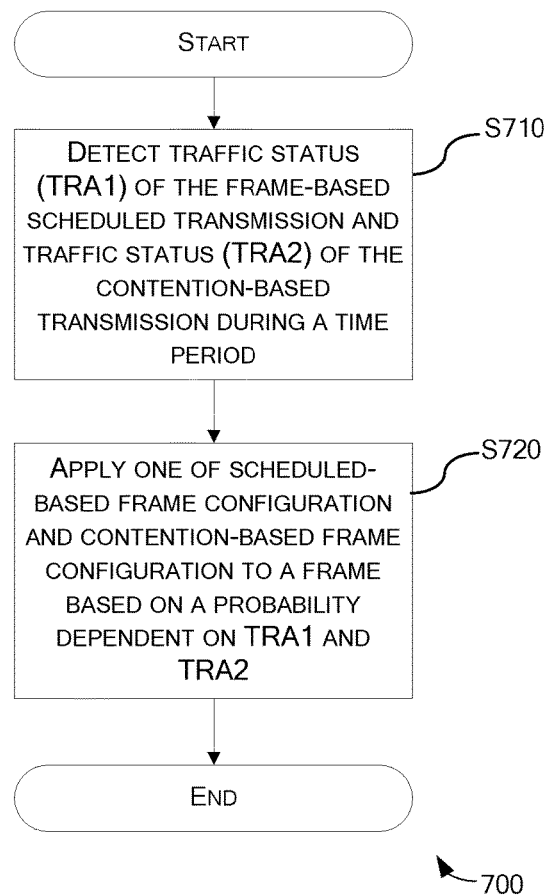
FIG. 7 is a flowchart illustrating the method for coordination of channel resources according to an embodiment of the present disclosure.

FIG. 7 is a flowchart illustrating the method 700 for coordination of channel resources between a first transmission and a second transmission according to an embodiment of the present disclosure. The first transmission and the second transmission share a common channel. In an embodiment, the first transmission is a frame-based scheduled transmission (e.g., an 802.16h transmission) and the second transmission is a contention-based transmission (e.g., an 802.11 transmission). The method 700 can be implemented in a network node (e.g., a base station) used for the frame-based scheduled transmission. The method 700 includes the following steps.

At step S710, the traffic status of the frame-based scheduled transmission during a time period T, is detected (denoted as TRA1), and the traffic status of the contention-based transmission during the time period T is also detected (denoted as TRA2). Herein, the network node used for the frame-based scheduled transmission can detect the traffic status of the contention-based transmission by means of interworking coordination or approximate estimation in QP.

In an embodiment, the traffic status TRA1 can be measured by the amount of data transmitted in the frame-based scheduled transmission during the time period T (denoted as DA1) and the traffic status TRA2 can be measured by the amount of data transmitted in the contention-based transmission during the time period T (denoted as DA2).

Alternatively, the traffic status TRA1 can be measured by the length of time when the channel is occupied by the frame-based scheduled transmission during the time period T (denoted as TL1) and the traffic status TRA2 can be measured by the length of time when the channel is occupied by the contention-based transmission during the time period T (denoted as TL2).

At step S720, one of a schedule-based frame configuration and a contention-based frame configuration is applied to a frame based on a probability value, p, dependent on the traffic status TRA1 and the traffic status TRA2. Here, when the schedule-based frame configuration is applied to the frame, the frame-based scheduled transmission uses the channel within the duration of the frame regardless of whether the contention-based transmission is using the channel. When the contention-based frame configuration is applied to the frame, the frame-based scheduled transmission is disabled (QP-based frame configuration) or shares the channel with the contention-based transmission in a contention-based manner within the duration of the frame (CW-based frame configuration).

In an embodiment, the probability value p is generated by a randomizer based on a probability distribution function dependent on TRA1 and TRA2. The probability distribution function here can be a 0-1 probability distribution function.

In an embodiment, the probability value p is indicative of a probability at which the schedule-based frame configuration is to be applied to the frame. When the TRA1 and the TRA2 are measured by DA1 and DA2, the probability value p can be calculated as:

$$p=DA1/(DA1+DA2).$$

Alternatively, when the TRA1 and the TRA2 are measured by TL1 and TL2, the probability value p can be calculated as:

$$p=TL1/(TL1+TL2).$$

In this case, the probability at which the contention-based frame configuration is to be applied to the frame (denoted as q) can be calculated as:

$$q=1-p.$$

As an example, when the amount of data transmitted in the frame-based scheduled transmission during the time period T is 200 k bits (DA1=200 kb) and the amount of data transmitted in the contention-based transmission during the time period T is 100 k bits (DA2=100 kb):

$$p=DA1/(DA1+DA2)=200/(200+100)=2/3.$$

In this case, the frame is configured as a schedule-based frame at a probability of 2/3 and as a contention-based (i.e., QP-based or CW-based) frame at a probability of 1/3.

As another example, when the length of time when the channel is occupied by the frame-based scheduled transmission during the time period T is 60 ms (TL1=60 ms) and the length of time when the channel is occupied by the contention-based transmission during the time period T is 40 ms (TL2=40 ms):

$$p=TL1/(TL1+TL2)=60/(60+40)=3/5.$$

In this case, the frame is configured as a schedule-based frame at a probability of 3/5 and as a contention-based (i.e., QP-based or CW-based) frame at a probability of 2/5.

In this way, more frames will be configured as schedule-based frames when the scheduled transmission has higher traffic than the contention-based transmission and, on the other hand, more frames will be configured as QP-based or CW-based frames when the contention-based transmission has higher traffic than the scheduled transmission. Therefore, the channel resources are adaptively coordinated between these transmissions.

Furthermore, when different priorities are given to the scheduled transmission and the contention-based transmission, or when another condition is imposed (e.g., to guarantee a delay-sensitive service of the scheduled system), the probability value can be optimized accordingly.

The method 700 can be triggered periodically (e.g., for every one or more frames) or by a specific event. In an embodiment, it is determined whether an aggregated occupancy of the frame-based scheduled transmission within a specific period exceeds a threshold and the method 700 is triggered only when the aggregated occupancy of the frame-based scheduled transmission exceeds the threshold.

Figure 8:
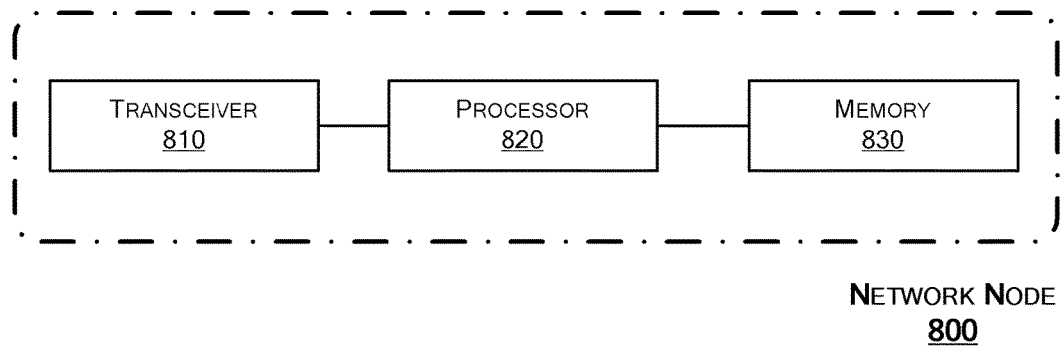
FIG. 8 is a block diagram of the network node according to an embodiment of the present disclosure.

FIG. 8 is a block diagram of a network node 800 according to an embodiment of the present disclosure. The network node 800 can be a base station.

The network node 800 includes: a transceiver 810; a processor 820; and a memory 830 storing instructions. The instructions, when executed by the processor 820, cause the network node 800 to perform the method 700 as described above in connection with FIG. 7. It is to be noted that the term "processor" used herein includes any hardware capable of executing instructions and/or program codes, e.g., a microprocessor such as a Central Processing Unit (CPU), a digital signal processor (DSP) and any other general-purpose or application specific processors. It is to be noted that the term "memory" used herein includes any storage medium capable of storing instructions and/or program codes, e.g., a magnetic storage medium, an optical storage medium, a semiconductor storage medium and any other volatile or non-volatile storage mediums.

Alternatively, the network node 800 can include several functional units which can be implemented in hardware, software, firmware or any combination thereof. In an embodiment, the network node 800 includes: a detection unit and a frame configuration unit. The detection unit is configured to detect the traffic status TRA1 of the frame-based scheduled transmission during the time period T and the traffic status TRA2 of the contention-based transmission during the time period T. The frame configuration unit is configured to apply one of a schedule-based frame configuration and a contention-based frame configuration a frame based on a probability value p dependent on the traffic status TRA1 and the traffic status TRA2. Here, when the schedule-based frame configuration is applied to the frame, the frame-based scheduled transmission uses the channel within the duration of the frame regardless of whether the contention-based transmission is using the channel. When the contention-based frame configuration is applied to the frame, the frame-based scheduled transmission is disabled (QP-based frame configuration) or shares the channel with the contention-based transmission in a contention-based manner within the duration of the frame (CW-based frame configuration).

In an embodiment, the network node 800 further includes a determination unit configured to determine whether an aggregated occupancy of the frame-based scheduled transmission within a specific period exceeds a threshold. The detection unit and the frame configuration unit are triggered only when the aggregated occupancy of the frame-based scheduled transmission exceeds the threshold.

It is to be noted that the contents described above in relation to the method of FIG. 7 also apply to the network node according to the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method in a network node for coordination of channel resources between a first transmission and a second transmission sharing a common channel, comprising:
   detecting a first traffic status of the first transmission and a second traffic status of the second transmission on the common channel during a time period; and
   applying one of a first frame configuration and a second frame configuration to a frame based on a probability value dependent on the first traffic status and the second traffic status,
   wherein when the first frame configuration is applied to the frame, the first transmission uses the common channel within the duration of the frame regardless of whether the second transmission is using the channel, and
   when the second frame configuration is applied to the frame, the first transmission is disabled or shares the common channel with the second transmission in a contention-based manner within the duration of the frame.

2. The method of claim 1, wherein the first transmission is a frame-based scheduled transmission and the second transmission is a contention-based transmission.

3. The method of claim 1, wherein the first traffic status is measured by a first amount of data transmitted on the common channel in the first transmission during the time period and the second traffic status is measured by a second amount of data transmitted on the common channel in the second transmission during the time period.

4. The method of claim 3, wherein the probability value is indicative of a probability at which the first frame configuration is to be applied to the frame and is dependent on the ratio of the first amount to the second amount.

5. The method of claim 1, wherein the first traffic status is measured by a first length of time when the common channel is occupied by the first transmission during the time period and the second traffic status is measured by a second length of time when the common channel is occupied by the second transmission during the time period.

6. The method of claim 5, wherein the probability value is indicative of a probability at which the first frame configuration is to be applied to the frame and is dependent on the ratio of the first length to the second length.

7. The method of claim 1, wherein the probability value is generated by a randomizer based on a probability distribution function dependent on the first traffic status and the second traffic status.

8. The method of claim 7, wherein the probability distribution function is a 0-1 probability distribution function.

9. The method of claim 1, further comprising:
determining whether an aggregated occupancy of the first transmission within a specific period exceeds a threshold; and
wherein the steps of detecting and applying are performed only when the aggregated occupancy of the first transmission exceeds the threshold.

10. A network node, comprising:
a transceiver;
a processor coupled to the transceiver; and
a memory coupled to the processor and storing instructions which, when executed by the processor, cause the network node to:
detect a first traffic status of the first transmission and a second traffic status of the second transmission on the common channel during a time period; and
apply one of a first frame configuration and a second frame configuration to a frame based on a probability value dependent on the first traffic status and the second traffic status,
wherein when the first frame configuration is applied to the frame, the first transmission uses the common channel within the duration of the frame regardless of whether the second transmission is using the channel, and
when the second frame configuration is applied to the frame, the first transmission is disabled or shares the common channel with the second transmission in a contention-based manner within the duration of the frame.

11. The network node of claim 10, wherein the network node is a base station.

12. The network node of claim 10, wherein the first transmission is a frame-based scheduled transmission and the second transmission is a contention-based transmission.

13. The network node of claim 10, wherein the first traffic status is measured by a first amount of data transmitted in the first transmission on the common channel during the time period and the second traffic status is measured by a second amount of data transmitted in the second transmission on the common channel during the time period.

14. The network node of claim 13, wherein the probability value is indicative of a probability at which the first frame configuration is to be applied to the frame and is dependent on the ratio of the first amount to the second amount.

15. The network node of claim 10, wherein the first traffic status is measured by a first length of time when the common channel is occupied by the first transmission during the time period and the second traffic status is measured by a second length of time when the common channel is occupied by the second transmission during the time period.

16. The network node of claim 15, wherein the probability value is indicative of a probability at which the first frame configuration is to be applied to the frame and is dependent on the ratio of the first length to the second length.

17. The network node of claim 10, wherein the probability value is generated by a randomizer based on a probability distribution function dependent on the first traffic status and the second traffic status.

18. The network node of claim 17, wherein the probability distribution function is a 0-1 probability distribution function.

19. The network node of claim 10, wherein the instructions which, when executed by the processor, further cause the network node to:
determine whether an aggregated occupancy of the first transmission within a specific period exceeds a threshold; and
wherein the steps of detecting and applying are performed only when the aggregated occupancy of the first transmission exceeds the threshold.

* * * * *